(12) United States Patent
Mocek et al.

(10) Patent No.: US 7,127,386 B2
(45) Date of Patent: Oct. 24, 2006

(54) JAVA TELEMATICS EMULATOR

(75) Inventors: Darryl J. Mocek, San Jose, CA (US);
William F. McWalter, Stirling (GB);
Behfar Razavi, San Jose, CA (US);
Dianna L. Decristo, Venice, CA (US);
Lisa M. Kelly, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 626 days.

(21) Appl. No.: 10/104,294

(22) Filed: Mar. 22, 2002

(65) Prior Publication Data

US 2003/0182099 A1 Sep. 25, 2003

(51) Int. Cl.
*G06F 9/455* (2006.01)

(52) U.S. Cl. ............... 703/23; 455/404.1; 455/404.2; 701/1; 701/2; 701/3; 701/29

(58) Field of Classification Search ............ 701/1–302; 455/1–899; 707/102, 100; 705/1; 719/328; 700/1–306
See application file for complete search history.

(56) References Cited

U.S. PATENT DOCUMENTS

| | | | | |
|---|---|---|---|---|
| 6,791,472 | B1 * | 9/2004 | Hoffberg | 340/905 |
| 2002/0055924 | A1 * | 5/2002 | Liming | 707/100 |
| 2002/0058499 | A1 * | 5/2002 | Ortiz | 455/412 |
| 2002/0059075 | A1 * | 5/2002 | Schick et al. | 705/1 |
| 2002/0156938 | A1 * | 10/2002 | Wong et al. | 709/328 |
| 2003/0004642 | A1 * | 1/2003 | Lin et al. | 701/301 |
| 2003/0036848 | A1 * | 2/2003 | Sheha et al. | 701/209 |
| 2003/0040324 | A1 * | 2/2003 | Eldering et al. | 455/456 |
| 2003/0131016 | A1 * | 7/2003 | Tanny et al. | 707/102 |
| 2003/0236601 | A1 * | 12/2003 | McLeod et al. | 701/29 |
| 2004/0054428 | A1 * | 3/2004 | Sheha et al. | 700/56 |
| 2004/0068364 | A1 * | 4/2004 | Zhao et al. | 701/201 |
| 2005/0032528 | A1 * | 2/2005 | Dowling et al. | 455/456.1 |
| 2005/0065678 | A1 * | 3/2005 | Smith et al. | 701/29 |

OTHER PUBLICATIONS

J.B. Alegiani, James L. Buxton, Stanley K. Honey, "An In-Vehicle Navigation and Information System Utilizing Defined Software Services," Vehicle Navigation and Information Systems Conference, 1989, pp. A-3 through A-8, New York, NY, IEEE.

(Continued)

*Primary Examiner*—Kamini Shah
*Assistant Examiner*—Cuong Van Luu
(74) *Attorney, Agent, or Firm*—Martine Penilla & Gencarella, LLP

(57) ABSTRACT

A system for emulating a telematics client is provided. The system includes a workstation in communication with a display screen. A software stack configured to be executed by the workstation to implement functionality for a telematics client is included. The software stack imitates a configuration of an in-vehicle telematics stack of a telematics control unit (TCU). The software stack includes a service gateway for loading an emulator. A user interface (UI) manager configured to communicate with the loaded emulator is included with the software stack. The UI manager enables a presentation of TCU user interface without accessing the TCU. Methods to emulate a user interface and loading an emulator on a workstation are also provided.

19 Claims, 9 Drawing Sheets

OTHER PUBLICATIONS

Achim Ibenthal, Christof Büttner, "Multimedia im Fahrzeug: Dienste und Technologie," ITG Fachberichte, VDE Verlag, Berlin, DE, No. 156, Sep. 27, 1999, pp. 43-52.

OSGi Service-Platform Release 2, "The Open Services Gateway Initiative", San Ramon, California.

DaimlerChrysler Corporation, DaimlerChrysler Research and Technology North America and Sun Microsystems, "DaimlerChrysler IT Cruiser Telematics Concept", Jan. 2001, pp. 1-11.

* cited by examiner

JAVA TELEMATICS EMULATOR

CROSS REFERENCE TO RELATED APPLICATIONS

This application is related to (1) U.S. patent application Ser. No. 10/104,267, filed Mar. 22, 2002, and entitled "Adaptive Connection Routing Over Multiple Communication Channels," (2) U.S. patent application Ser. No. 10/105,121, filed Mar. 22, 2002, and entitled "Arbitration of Communication Channel Bandwidth," (3) U.S. patent application Ser. No. 10/104,351, filed Mar. 22, 2002, and entitled "System and Method for Distributed Preference Data Services," (4) U.S. patent application Ser. No. 10/104,297, filed Mar. 22, 2002, and entitled "Asynchronous Protocol Framework," (5) U.S. patent application Ser. No. 10/104,298, filed Mar. 22, 2002, and entitled "Business-Model Agnostic Service Deployment Management Service," (6) U.S. patent application Ser. No. 10/104,295, filed Mar. 22, 2002, and entitled "Manager Level Device/Service Arbitrator," (7) U.S. patent application Ser. No. 10/104,246, filed Mar. 22, 2002, and entitled "Java Telematics System Preferences," (8) U.S. patent application Ser. No. 10/104,243, filed Mar. 22, 2002, and entitled "System and Method for Testing Telematics Software," (9) U.S. patent application Ser. No. 10/104,860, filed Mar. 22, 2002, and entitled "System and Method for Simulating an Input to a Telematics System," and (10) U.S. patent application Ser. No. 10/104,245, filed Mar. 22, 2002, and entitled "Abstract User Interface Manager with Prioritization," which are incorporated herein be reference.

BACKGROUND OF THE INVENTION

1. Field of the Invention

This invention relates generally to network-centric telematics services and applications supplied to vehicles and more particularly to a client toolkit for application developers to develop cross platform telematics services in a java technology.

2. Description of the Related Art

The electronic content and sophistication of automotive designs has grown markedly. Microprocessors are prevalent in a growing array of automotive entertainment safety and control functions. Consequently, this electronic content is playing an increasing role in the sales and revenues of the automakers. The features provided by the electronic content include audio systems, vehicle stability control, driver activated power train controls, adaptive cruise control, route mapping, collision warning systems, etc. The significant increase of the electronic content of land based vehicles has concomitantly occurred with the explosive growth of the Internet and the associated data driven applications supplied through mobile applications.

Telematics, a broad term that refers to vehicle-based communication systems and information services, promises to combine vehicle safety, entertainment and convenience features through wireless access to distributed networks, such as the Internet. Telematics offers the promise to move away from the hardware-centric model from audio and vehicle control systems that are built into devices that are custom designed for each vehicle, to infotainment delivered by plug-and-play hardware whose functionality can be upgraded through software loads or simple module replacement. Furthermore, new revenue streams will be opened up to automobile manufacturers and service providers through the products and services made available through telematics.

Since these infotainment systems integrate entertainment and information within a common envelope, the systems need to be highly integrated, open and configurable. However, the electronic systems currently on the market are custom designed for the make, model, year and world region in which the vehicle is sold. Additionally, the electronic systems being used today are linked by proprietary busses having severely limited bandwidth that are inadequate for data-intensive services combining information entertainment and safety. The proprietary and customized systems require a developer to know the underlying software and hardware application program interfaces (APIs) in order to develop applications for future infotainment systems. However, numerous proprietary and customized systems are spread across the various makes and models of the vehicles in the marketplace and even within the same models from year to year. Thus, the heterogeneous nature of the various systems essentially eliminates any benefits of economies of scale since equipment and software must be tailored to each model permutation.

Furthermore, the embedded boards that are used by vehicle manufacturers are tried and tested with respect to mission critical systems, however, they are difficult to work with for a developer. More particularly, the developing and testing of an application that provides functionality for telematics systems associated with a vehicle is burdensome not only because of the heterogeneous nature of the multitude of embedded boards used, but also because of the configuration of embedded boards in general, i.e., limited memory, serial ports, etc., that require obtaining specialized hardware for a developer to work with the systems. Thus, the developer must invest in back-end infrastructure or an embedded development environment. It should be appreciated that some of these boards are not equipped with local storage, the board must be hooked up to a personal computer that has a special software program that can load the operating system over a network. Additionally, debugging the application on the board itself requires tying into a serial port of the board and reviewing generated text. These barriers would deter an independent developer from providing infotainment applications outside of the mission critical vehicle system applications provided by vehicle manufacturers.

A self-contained personal computer model, also referred to as the fat client model, has been proposed to provide a uniform standard across makes and models of vehicles. Here, the client performs the bulk of the data processing operations. However, there are a number of shortcomings of this model. For instance, the tightly coupled operating system/hardware architecture does not provide multi-platform support. Additionally, desktop operating systems are too general purpose and too large to fit in the restricted physical envelope of telematics devices. More importantly, the susceptibility to viruses and the general lack of security would be an unacceptable risk for the automobile manufacturer.

In view of the forgoing, there is a need for a system and method to encourage independent developers to develop and test applications for execution by a telematics control unit in order for a wide range of functionality to be made available to telematics consumers.

SUMMARY OF THE INVENTION

Broadly speaking, the present invention fills these needs by providing a development toolkit including an emulator configured to substitute for the in-vehicle telematics control unit (TCU) and the features of the TCU user interface. It should be appreciated that the present invention can be implemented in numerous ways, including as an apparatus, a system, a device, or a method. Several inventive embodiments of the present invention are described below.

In one embodiment, a system for emulating a telematics client is provided. The system includes a workstation in communication with a display screen. A software stack configured to be executed by the workstation to implement functionality for a telematics client is included. The software stack imitates a configuration of an in-vehicle telematics stack of a telematics control unit (TCU). The software stack includes a service gateway for loading an emulator. A user interface (UI) manager configured to communicate with the loaded emulator is included with the software stack. The UI manager enables a presentation of TCU user interface without accessing the TCU.

In another embodiment, a method for emulating a telematics control unit (TCU) user interface is provided. The method initiates with obtaining an emulator of a TCU. Next, a client application configured to run on the emulator is defined. Then, the client application is executed by the emulator to evaluate a presentation of the client application.

In yet another embodiment, a method for loading an emulator on a workstation configured to provide an emulation of a telematics control unit (TCU) user interface is provided. The method initiates with launching a service gateway. Then, an archive file defining an emulator is specified. Next, the archive file is executed to enable a display of a TCU user interface. Then, a vehicle description file is read to define features of the TCU user interface.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION OF THE PREFERRED EMBODIMENTS

Figure 1:
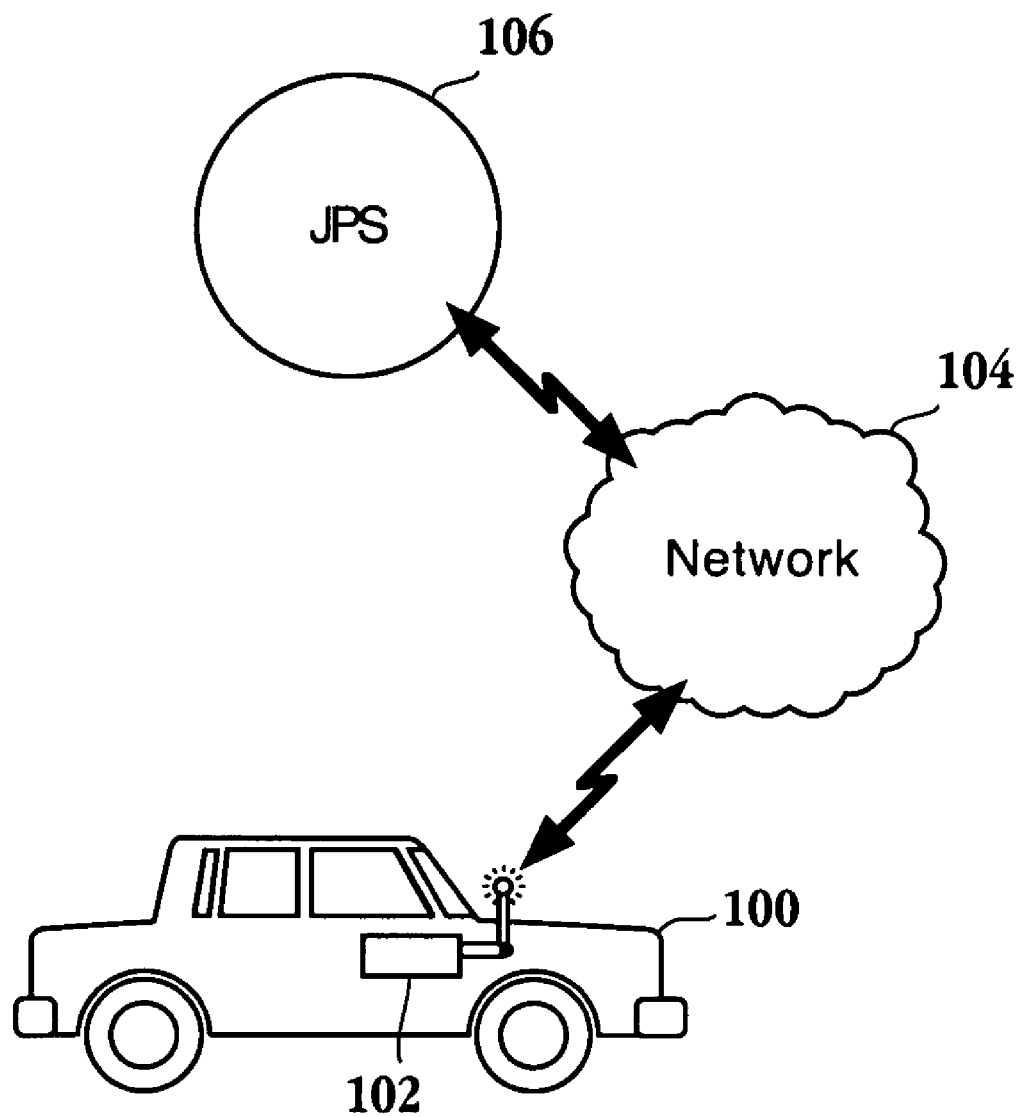
FIG. 1 is a high level schematic overview of an automotive telematics system in accordance with one embodiment of the invention.

An invention is disclosed for an emulator allowing a developer to execute applications for a telematics system in both an abstract user interface mode and a direct user interface mode. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

The embodiments of the invention described herein provide an emulator which is a component of a development toolkit for the telematics system. As will be explained in more detail below, the client side of the telematics system includes a telematics control unit (TCU) that ties into the vehicle systems. In one embodiment, the TCU is associated with a user interface (UI) that provides a user with access to control options. It should be appreciated that the user can interact with the TCU through speech recognition, a mouse type device, touch pad or some other suitable mechanism which has a minimal impact on the unique human-machine interface of an automobile while satisfying the small footprint requirement of an embedded system. Of course, a passenger of the vehicle is not limited by the restrictions on the driver with respect to the interaction with the UI.

The TCU can tie into any of the control systems, safety systems, entertainment systems, information systems, etc., of the vehicle. It will be apparent to one skilled in the art that the client side stack of the TCU is utilized to access a vehicle interface component for accessing in-vehicle devices, such as the speedometer, revolutions per minute (rpm) indicator, oil pressure, tire pressure, global positioning system (GPS), door locks, etc. Thus, client side applications sitting in the TCU will allow for the functionality with respect to the vehicle systems as well as infotainment applications.

The development toolkit allows accessibility for software developers without the need for the developer to directly interface with the microprocessor of the embedded board. The developers of the client applications can develop and test the applications through the emulation, simulation and code checker software which can be downloaded to a developer's personal computer or work station.

In one embodiment, the telematics system deploys Java technology. It should be appreciated that Java technology's platform-independence and superior security model provide a cross-platform solution for the heterogeneous systems of a vehicle while maintaining a security architecture protecting against viruses and unauthorized access. In addition, the write once, run anywhere nature of the Java language allows content providers to write their applications for a class of device. Thus, the content or service provider is insulated against the myriad of car platforms while vehicle manufacturers are protected against hacker threats. The Java language encourages object oriented design and its automatic memory management prevents most common sources of programming errors, i.e., memory leaks and corruption. In addition, Java application program interfaces (APIs) are available to support telematics mediums, such as speech recognition through Java Speech API (JSAPI), media delivery through Java Media Framework (JMF) and wireless telephony through Wireless telephony communications APIs (WTCA), etc.

One aspect of the development process which is addressed by the development toolkit is the emulation of the user interface of the TCU which may include a display screen, controls, speech interface, etc. while the simulator simulates vehicle devices. Therefore, the developer can emulate the screen and controls in order to create applications in an abstract mode without the need to have access to the embedded board or vehicle. In one embodiment of the invention, the developer has access to different configurations of the TCU so that client applications can be developed irrespective of the model of the TCU or for that matter the model of the vehicle. That is, the emulator allows the developer to write client applications for a TCU on a standard personal computer readily available in the market place. Furthermore, the emulator allows a developer to have a high level of confidence that the client application will behave the same when the application is deployed in the vehicle as it does on the emulator.

FIG. 1 is a high level schematic overview of an automotive telematics system in accordance with one embodiment of the invention. A client/server architecture relying on standards and principles of modular design allows for functionality of the telematics system to be delivered to the customer through wireless access. The server side includes Java provisioning server (JPS) 106 in communication with network 104. For a detailed description of JPS 106 please refer to U.S. patent application Ser. No. 10/104,267, filed on Mar. 22, 2002 and entitled "Adaptive Connection Routing Over Multiple Communication Channels," which is incorporated herein by reference in its entirety. The client side includes telematics control unit (TCU) 102 contained within the body of land based vehicle 100. TCU 102 is enabled to communicate with network 104 through wireless access. Of course, network 104 can be any distributed network such as the Internet and the wireless access protocol (WAP) can be any suitable protocol for providing sufficient bandwidth for TCU 102 to communicate with the network. It should be appreciated that the client/server architecture of FIG. 1 allows for the evolution from hard wired, self contained components to platform based offerings relying on software and upgrades. Thus, a service provider controlling JPS 106 can deliver an unbundled, open end-to-end solution enabling plug and play applications. For example, the service can be a tier-based service similar to home satellite and cable services. It will be apparent to one skilled in the art that an open platform, such as frameworks based on Java technology, enables a developer to create executable applications without regard to the underlying hardware or operating system. While FIG. 1 illustrates an automobile, it should be appreciated that TCU 102 can be incorporated in any vehicle or mode of transportation whether it is land based or non-land based. For example, a boat, a plane, a helicopter, etc. can incorporate TCU 102.

Figure 2:
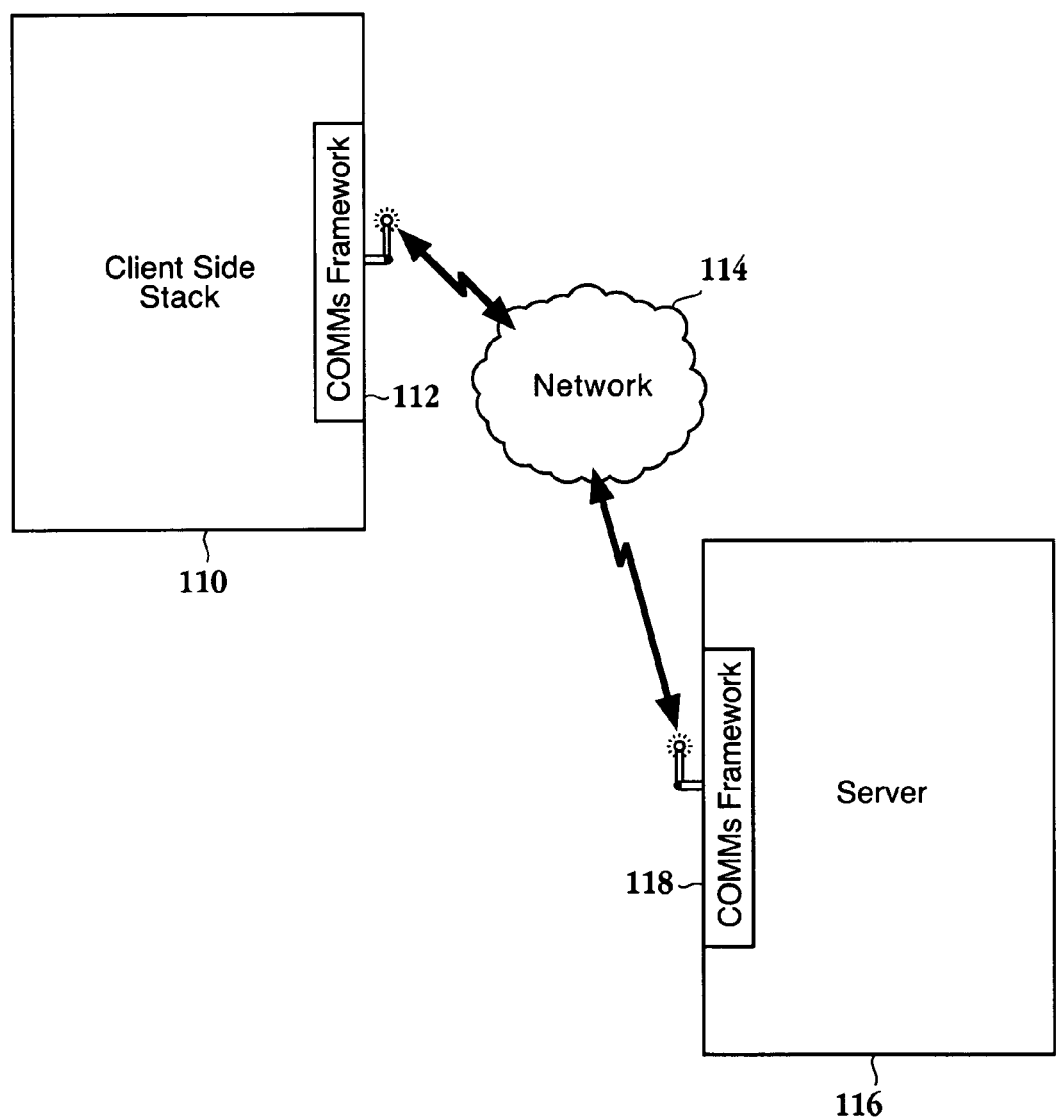
FIG. 2 is a schematic diagram of a telematics client communicating through a wireless network with a telematics server in accordance with one embodiment of the invention.

FIG. 2 is a schematic diagram of a telematics client communicating through a wireless network with a telematics server in accordance with one embodiment of the invention. Client side stack 110 includes the necessary layers for a client application, also referred to as a manager or a carlet, to be executed to provide functionality. As will be explained further below, the carlet has access to each layer of the client side stack 110. Included in client side stack 110 is client communication framework 112. Client communication framework 112 enables communication between the client side stack 110 and an application on server 116 through network 114. It should be appreciated that server 116 is not limited to a wireless connection. For example, server 116 can be hardwired into network 114. One skilled in the art will appreciate that where server 116 communicates through a wireless connection with network 114, the communication proceeds through server communication framework 118. With respect to an embodiment where server 116 is hardwired to network 114, the server can communicate with network 114 through a network portal (e.g. the Internet) rather than server communication framework 118. Additionally, network 114 can be any suitable distributed network, such as the Internet, a local area network (LAN), metropolitan area network (MAN), wide area network (WAN), etc.

Figure 3:
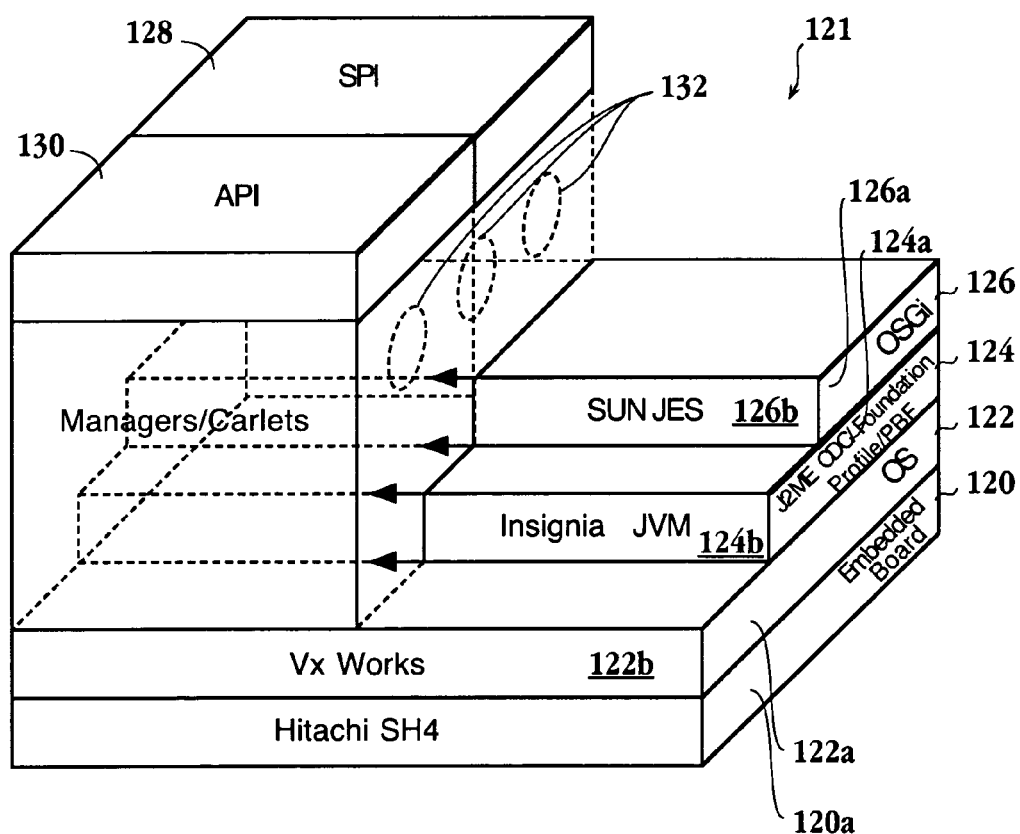
FIG. 3 is a three dimensional pictorial representation of a telematics client reference implementation of the client side stack of FIG. 2 in accordance with one embodiment of the invention.

FIG. 3 is a three dimensional pictorial representation of a telematics client implementation of the client side stack of FIG. 2 in accordance with one embodiment of the invention. Client side implementation 121 includes hardware layer 120 of the client includes an embedded board containing a telematics control unit (TCU). As mentioned with reference to FIG. 1, the TCU is incorporated into a land based vehicle. In one embodiment, the TCU is in communication with the electronic components of a vehicle through a vehicle bus or other communication means. These components include the measurement of vehicle operating and safety parameters, such as tire pressure, speed, oil pressure, engine temperature, etc., as well as information and entertainment components, such as audio system settings, internet access, email, news, environmental control within the cabin of the vehicle, seat positions, etc. One skilled in the art will appreciate that the telematics control unit is capable of integrating the functionality of various handheld information and entertainment (infotainment) devices, such as mobile phones, personal digital assistants (PDA), MP3 players, etc.

Still referring to FIG. 3, operating system layer 122 sits above hardware layer 120. Java virtual machine (JVM) layer 124 sits on top of operating system (OS) layer 122 and open services gateway initiative (OSGI) layer 126 sits on top of the JVM layer. It should be appreciated that the standard for JVM layer 124 includes Java 2 Platform Micro Edition (J2ME), Connected Device Configuration (CDC), Connected Limited Device Configuration (CLDC), Foundation Profile, Personal Profile or Personal Basis Profile. One skilled in the art will appreciate that J2ME Foundation Profile is a set of APIs meant for applications running on small devices that have some type of network connection, while J2ME CDC Personal Profile or Personal Basis Profile provides the J2ME CDC environment for those devices with a need for a high degree of Internet connectivity and web fidelity. The standards for each of the layers of the stack are provided on the right side of client side implementation 121. In particular, OSGI 126*a*, J2ME CDC 124*a*, OS 122*a*, and embedded board 120*a* are standards and to the left of the standards are examples of actual products that implement the standards. For example, OSGI 126*a* standard is implemented by Sun's Java Embedded Server (JES) 2.1 126*b*, J2ME 124*a* standard is implemented by Insignia's Virtual Machine 124*b*, OS 122*a* is implemented by Wind River's VxWorks real time operating system 122*b*, and embedded board 120*a* is an embedded personal computer based board such as Hitachi's SH4. It should be appreciated that the actual products are exemplary only and not meant to be limiting as any suitable product implementing the standards can be utilized.

Carlets 132 of FIG. 3, have access to each layer above and including OS layer 122. Application program interface (API) layer 130 is the layer that carlets use to communicate with the JTC. Service provider interface (SPI) layer 128 is a private interface that managers have among each other. One skilled in the art will appreciate that OSGI layer 126 provides a framework upon which applications can run. Additional functionality over and above the JVM, such as lifecycle management is provided by OSGI layer 126. It should be appreciated that the open services gateway initiative is a cross industry working group defining a set of open APIs for a service gateway for a telematics systems. These APIs consist of a set of core framework APIs. In order to deploy services and their implementations OSGI defines a packaging unit called a service bundle. A service bundle is a Java Archive (JAR) file containing a set of service definitions along with their corresponding implementation. Both infrastructure services and carlets are deployed as service bundles. Some of the functionality for arbitrating, controlling and managing devices and resources, e.g., speakers, cell phones, etc., by OSGI layer 126. However, one skilled in the art will appreciate that a separate arbitration service may also be required. As used herein, a carlet is a Java application. For each function or task to be processed on the client side or between the client and server sides, a carlet is invoked to manage the operation. In this manner, carlets can be independently written, tested, and launched for use on a telematics system. By way of example, a carlet can be written to control or monitor the activity of automobile components (e.g., tires, engine oil, wiper activity, steering tightness, maintenance recommendations, air bag control, transmission control, etc.), and to control or monitor applications to be processed by the telematics control unit (TCU) and interacted with using the on-board automobile monitor. As such, specialized carlets can be written to control the audio system, entertainment modules (e.g., such as on-line games or movies), voice recognition, telecommunications, email communications (text and voice driven), etc. Accordingly, the type of carlets that can be written is unlimited. Carlets may be pre-installed or downloaded from a sever. A carlet may or may not have an API which may be invoked by other carlets and it may or it may not have running threads of its own.

Figure 4:
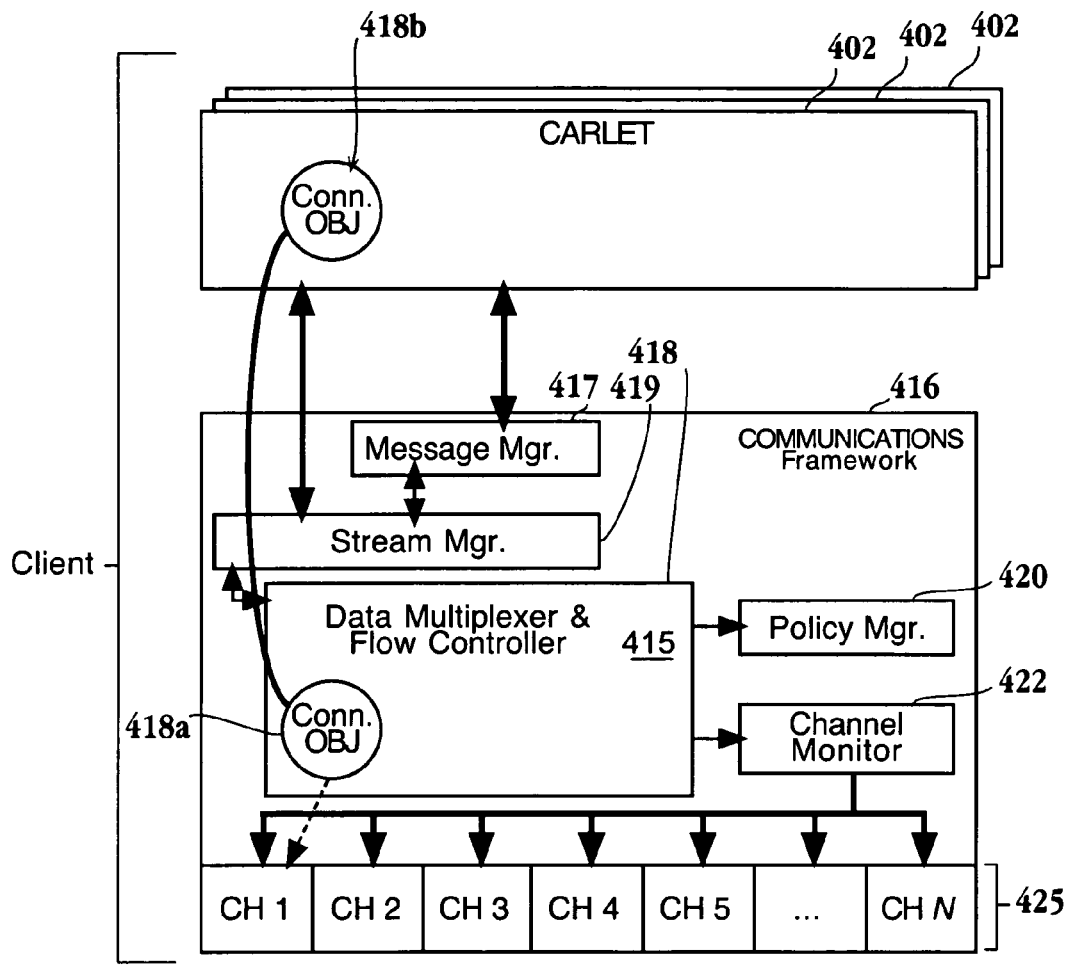
FIG. 4 is a high level schematic diagram of the interaction between a carlet and a communications framework on the client side of a telematics system in accordance with one embodiment of the invention.

FIG. 4 is a high level schematic diagram of the interaction between a carlet and a communications framework on the client side of a telematics system in accordance with one embodiment of the invention. It should be appreciated that the server side has a similar communication framework to establish and enable synchronous communication between the client side (e.g., a telematics control unit on a vehicle) and the server side (e.g., a Java telematics server). The communications framework 416 includes a message manager 417, a stream manager 419, a data multiplexer and flow controller 418, a policy manager 420, a channel monitor 422, and an interface to the various physical channels available to the communications framework of the client side.

Still referring to FIG. 4, when a particular carlet application 402 is requested, the carlet will communicate with the stream manager 419 and request that a connection be established. In response, the stream manager 419 will request a connection object (Conn. OBJ) 418a from the data multiplexer and flow controller 415. Once a channel satisfying the request is available, the data multiplexer and flow controller 415 will return a connection object (Conn. OBJ) 418b back to the carlet. Thus, a communication link is established between the carlet application 402 via the connection objects 418a and 418b of the data multiplexer and flow controller 415. In one embodiment, the connection object 418a of the data multiplexer and flow controller 418 has the ability to switch between channels 425 that are available to the communications framework 416 of the client side. Here, code contained in the policy manager enables selection of different channels depending upon availability, the type of communication desired, bandwidth requirements for a given data transfer or transfers, payment of a bandwidth fee, subscription level, etc.

Figure 5:
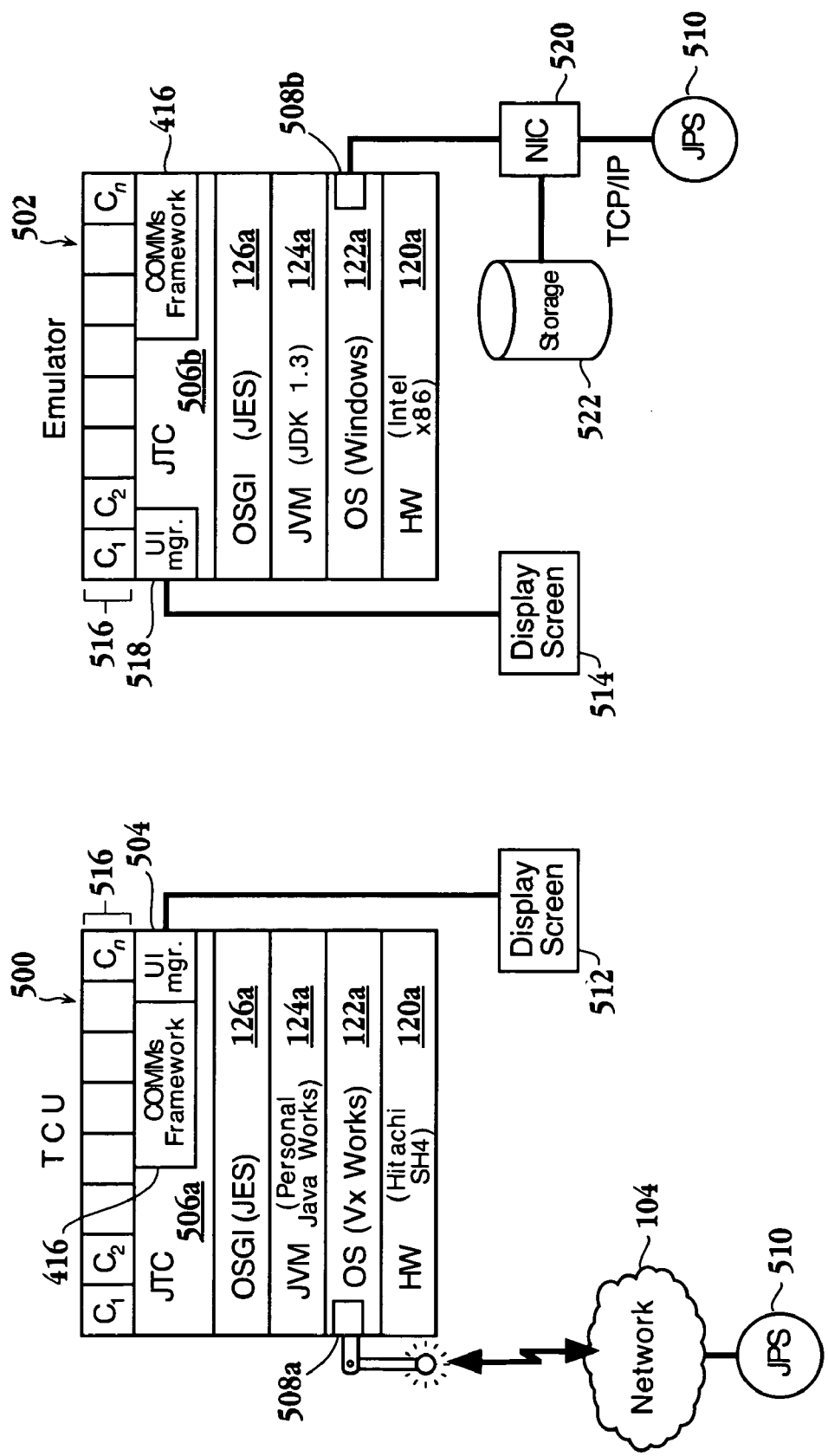
FIG. 5 is a logical schematic of a side by side comparison of the client side stack of the telematic control unit (TCU) and the imitated stack of the Emulator in accordance with one embodiment of the invention.

FIG. 5 is a logical schematic of a side by side comparison of the client side stack of the telematic control unit (TCU) and the imitated stack of the Emulator in accordance with one embodiment of the invention. The client side stack of TCU 500 is essentially a two dimensional representation of FIG. 3. Standards defined for each layer of the stack are the same as described above with respect to FIG. 3. In particular hardware layer 120a, operating system layer 122a, JVM layer 124a and OSGI layer 126a are included. As mentioned above exemplary products for implementing those standards are listed, however they are not meant to be limiting. Java telematics client (JTC) sits on top of OSGI layer 126a. Included in JTC is user interface (UI) manager 504, Automotive APIs and communication framework 416. It will be apparent to one skilled in the art that UI manager 512 is configured to transmit image data to be displayed on display screen 512. Carlets $C_1$ through $C_n$ of row 516 are the client applications executed by TCU 500. At OS level 122a of TCU 500, communication driver 508a enables communication with Java provisioning server (JPS) 510 through wireless network 104.

Still referring to FIG. 5, the in-vehicle telematics software stack that runs on TCU 500 is emulated for an operating system of a workstation, such as Microsoft Windows running on a personal computer. Of course, the emulator can be run on other commercially available operating systems for personal computers or workstations. That is, the target development platform can be any suitable commercially available operating system. One skilled in the art will appreciate that the standards for the layers of TCU 500 and Emulator 502 are the same, however, the products implementing the standards can be different due to the differences between a workstation environment for the emulator and the embedded system for the TCU. As the emulator is configured to allow a developer access to the software stack of the client to evaluate the look and feel of carlets $C_1$ through $C_n$ 516 and is run on a desktop computer or workstation, the emulator has access to more resources in terms of speed, memory, etc. than the embedded board environment of TCU 500. Thus hardware level 120a can include a central processing unit such as an Intel or Advanced Micro Devices microprocessor. OS layer 122a can be implemented through a common operating system platform such as Microsoft Windows and JVM layer 124a can be implemented through Java Development Kit (JDK) 1.3. The remaining layers of the two stacks are implemented with the same products in one embodiment. It will be apparent to one skilled in the art that some components of JTC layers 506a and 506b of TCU 500 and emulator 502, respectively, will be different depending on the functionality required by the emulator. For example, communication driver 508a is different than communication driver 508b. The difference stems from the fact that communication driver 508a enables wireless access to JPS 510, while communication driver 508b enables a connection over a TCP/IP connection to JPS 510.

Emulator 502 of FIG. 5 emulates an image of the display as presented by TCU 500 to display screen 512. That is, display screen 512 is presented on display screen 514 for the developer using emulator 502. Thus, UI manager 518 of emulator 502 contains additional code as compared to UI manager 504 of TCU 500 because the UI manager 518 of the emulator provides additional functionality for display screen 514 as opposed to the functionality provided by UI manager 504 for display screen 512. Communication driver 508b of OS layer 122a enables communication with network interface card (NIC) 520. NIC 520 is in communication with storage 522. NIC 520 is configured to communicate with JPS 510 through a network, such as the Internet via a transmission control protocol/Internet protocol (TCP/IP) connection. One skilled in the art will appreciate that a wireless communication standard such as Bluetooth or 802.11b may be used, thus eliminating the need for NIC 520. In one embodiment, carlets $C_1$ through $C_n$ have access to a portion of JVM layer 124a, OSGI layer 126a and JTC layer 506b. It will be apparent to one skilled in the art that the carlets may not have access to hardware layer 120a, OS layer 122a and a significant portion of JVM layer 124a for security purposes. In one embodiment, a vehicle manufactures can decide to provide limited access to these layers.

Figure 6:
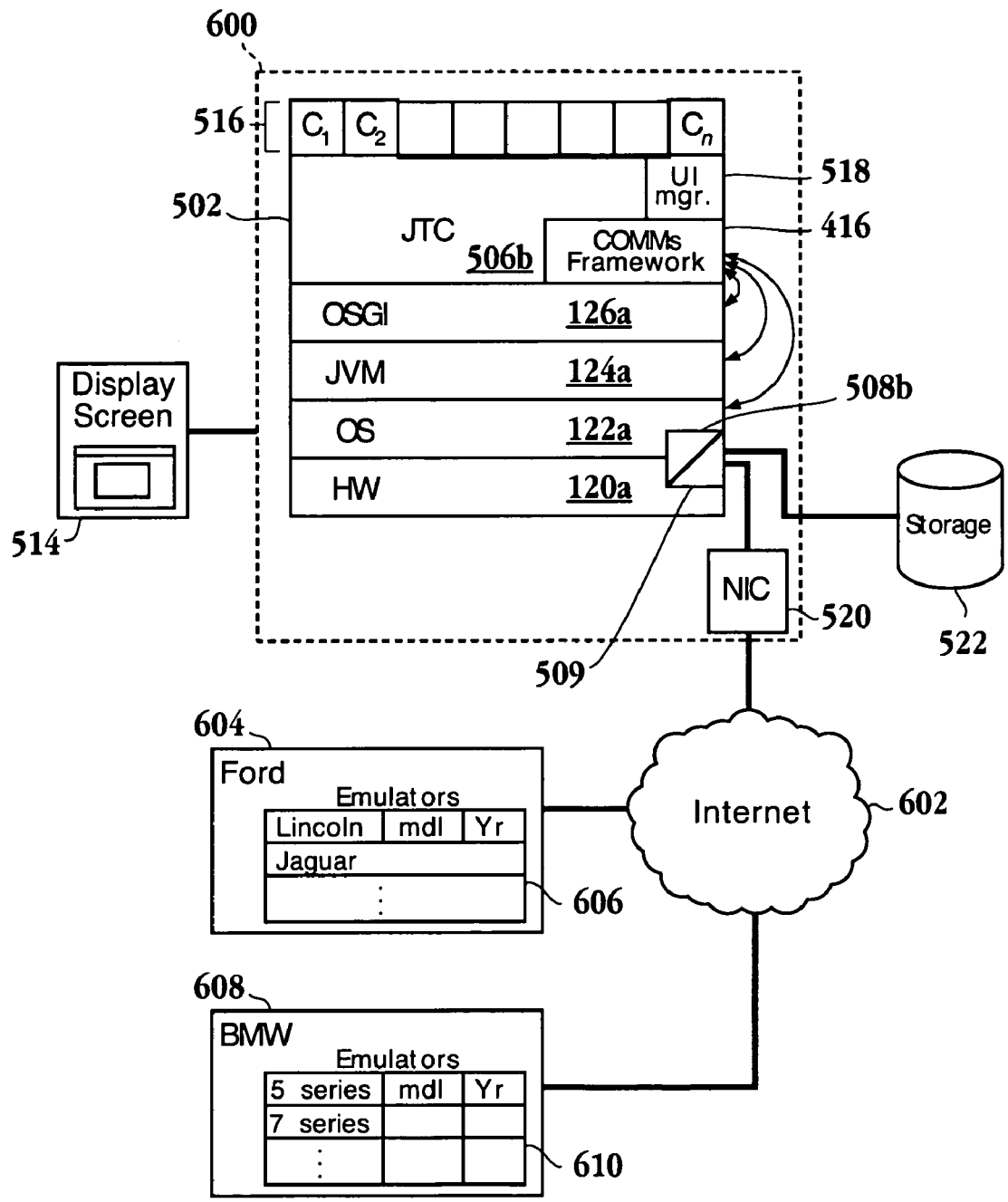
FIG. 6 is a schematic diagram of the emulator stack in a workstation configured to load emulators from various sources in accordance with one embodiment of the invention.

FIG. 6 is a schematic diagram of the emulator stack in a workstation configured to load emulators from various sources in accordance with one embodiment of the invention. Software stack of emulator 502 resides inside workstation 600. In one embodiment workstation 600 is a personal computer. Workstation 600 is in communication with display screen 514 and storage 522, Communications driver 508b and hardware interface 509 enables communication with the Internet 602 through NIC 520. In one embodiment, vehicle manufacturers provide emulators for vehicles which they produce on a web page that can be downloaded through the Internet 602. For example, Ford can provide a web page 604 that includes list 606 of emulators for vehicles that Ford produces. Similarly, BMW can provide a web page 608 that includes list 610 of emulators for vehicles that BMW produces. It should be appreciated that any vehicle manufacturer may provide developers access to emulators for specific vehicles. Additionally, the emulators can be accessed by employees of the vehicle manufacturers through a company intranet in one embodiment of the invention. Since, communication framework 416 communicates with each of the layers of the software stack, the emulator can be downloaded to the workstation and UI manager can communicate with the emulator so that a window of an emulation of the TCU can be built on display screen 514.

Still referring to FIG. 6, storage 522 may also be used to obtain an emulator from storage media such as a compact disc or floppy disk. For example, a vehicle manufacturer may provide the emulators on portable storage mediums available to developers. The storage medium is read by workstation 600 to allow UI manager 518 to communicate with the emulator. It should be appreciated that an emulator can be used as a prototyping tool for user interfaces not yet built. Where a vehicle, or a TCU for an existing vehicle, has not yet been built, an emulator can be created to provide the look and feel of a prototype for presenting the carlets. Additionally, the wide accessibility of the emulators allows a developer to run a carlet on a variety of vehicle types without regard to the underlying hardware or heterogeneous nature of the embedded boards of the vehicle. For example, if a developer wishes to test a MP3 player carlet on every vehicle made, the developer is able to download the emulators from the appropriate web sites and proceed to check the MP3 carlet against each emulator. Alternatively, the developer may obtain the emulators from a portable storage medium or some combination of downloading from the Internet and retrieving from storage mediums. In one embodiment, the emulators are chosen by year for each model as the bus codes for controlling the devices of the vehicle change from year to year. However, the actual telematics system technology performs the operations in a consistent manner even if the bus codes change from year to year, with the operation being translated to the correct bus code depending on the model year of the vehicle.

Figure 7:
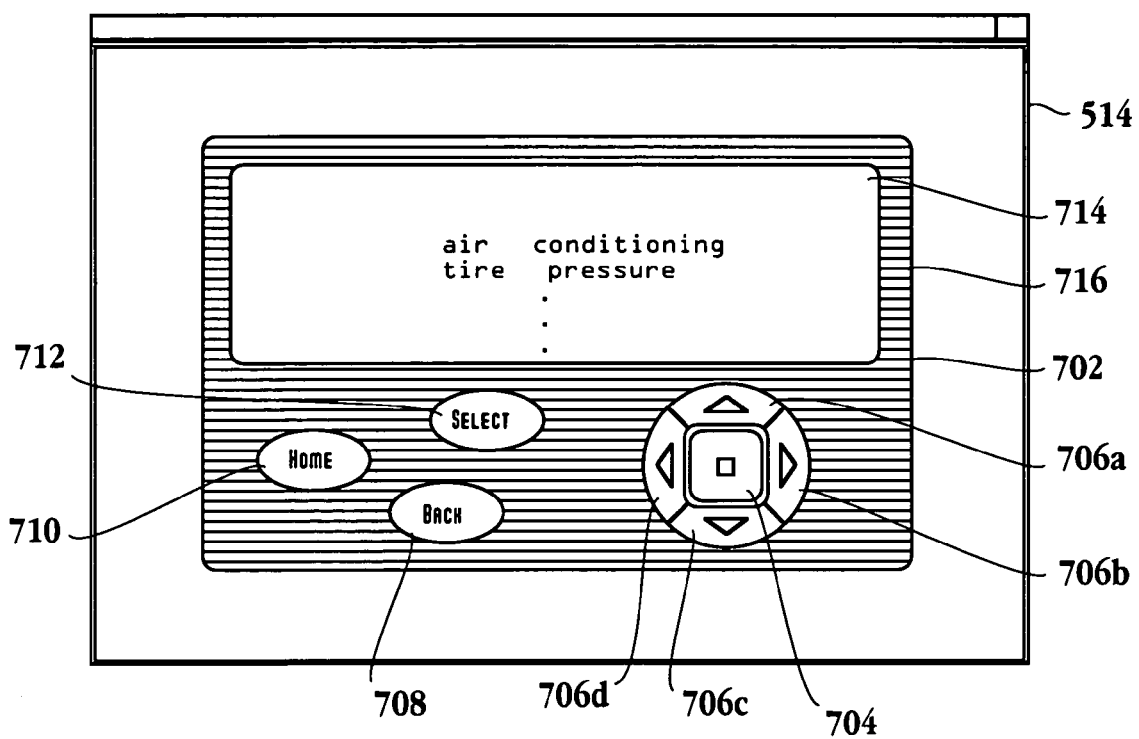
FIG. 7 is a schematic diagram of an emulated user interface presented on a display screen by the emulator in accordance with one embodiment of the invention.

FIG. 7 is a schematic diagram of an emulated user interface presented on a display screen by the emulator in accordance with one embodiment of the invention. Display screen 514, also referred to as a large screen user interface, displays an emulated image 702 of the user interface presented to an occupant of a vehicle having a TCU display screen. In one embodiment, image 702 is a recreation of display screen 512 of FIG. 5. A carlet browser is displayed on screen image 714 within image 702. In one embodiment, the carlet browser displays a list of carlets that implement a UI/carlet/Java interface. Image 702 includes a faceplate image 716 along with images of control knob 704, and directional pads 706a, 706b, 706c, and 706d. Images of back button 708, home button 710 and select button 712 are also included. Control knob 704 is a dial knob configured to turn in a clockwise or counterclockwise direction and offers navigational capabilities in one embodiment of the invention. Control knob 704 and directional pads 706a, 706b, 706c, and 706d are referred to as a complex control. Home button 710 allows a telematics user to return to a home page of the carlet browser. Back button 708 offers step-back functionality, while select button 712 acts as an enter key. Thus, the screen and controls, which are the two features that a telematics user employs to interact with the TCU, are provided by the emulator. While specific button types are provided, it should be appreciated that the button types are not meant to be limiting as any interface suitable for a vehicle can be provided. It should be appreciated that the features making up the emulated TCU user interface are stored in a vehicle description file, also referred to as an emulator description file. In one embodiment, the vehicle description file is an extensible markup language (XML) file. Thus, a Java class file is written for each of the features, i.e., control buttons, faceplate screen size, etc., and is enclosed in an emulator Java Archive (JAR) file. The Java class for each of the components includes the information on how the components behave, what they do, etc., while the XML file specifies the image for the faceplate, the location and size of the screen and the controls, the class files for performing the functionality of the controls, etc. In one embodiment, the emulator is provided a vehicle description file at the command line when the emulator JAR file is loaded.

Figure 8:
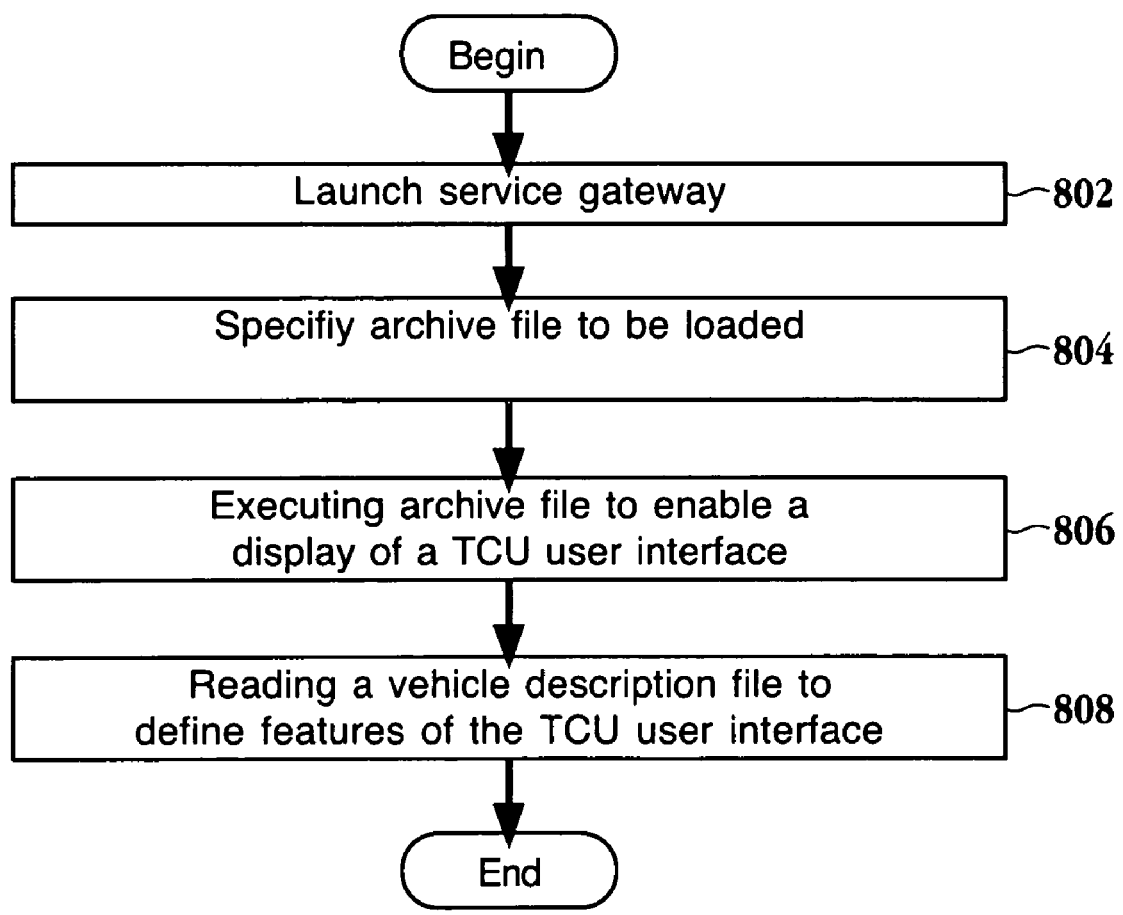
FIG. 8 is a flowchart diagram of the method operations performed for loading an emulator in accordance with one embodiment of the invention.

FIG. 8 is a flowchart diagram of the method operations performed for loading an emulator in accordance with one embodiment of the invention. The method initiates with operation 802 where the open services gateway initiative (OSGI) implementing product is launched. In one embodiment, the Java embedded server is used to implement the OSGI standard. It will be apparent to one skilled in the art that the OSGI standard defines the standard of extensible lightweight, Java based, lightweight independent software components called services as described above with reference to FIG. 3. The method then advances to operation 804 where a Java Archive (JAR) file to be loaded is specified. In one embodiment a list of JAR files is provided to the OSGI layer, where one of the JAR files is the emulator. One skilled in the art will appreciate that the JAR file format enables one to bundle multiple files into a single archive file. Typically a JAR file will contain the class files and auxiliary resources associated with applets and applications. The method then proceeds to operation 806 where the JAR file is executed. Here, the execution of the JAR files enables the emulator, which in turn can then run a carlet. In one embodiment, a carlet browser is started, where the carlet browser contains a list of carlets that implement the UI/carlet/Java interface. Thus, a list of carlets is displayed on the carlet browser as illustrated with reference to FIG. 7. In addition, the emulator reads a vehicle description file here which provides all the information for the TCU user interface, such as screen size, feature locations, etc. The method then moves to operation 808 where a user can navigate through carlets and invoke sub-carlets as needed. Here, the user will use the control buttons with reference to FIG. 7 to scroll down the list and select a carlet. It should be appreciated that when selecting a carlet, a sub-carlet, such as a newly tested carlet, may be invoked here.

Figure 9:
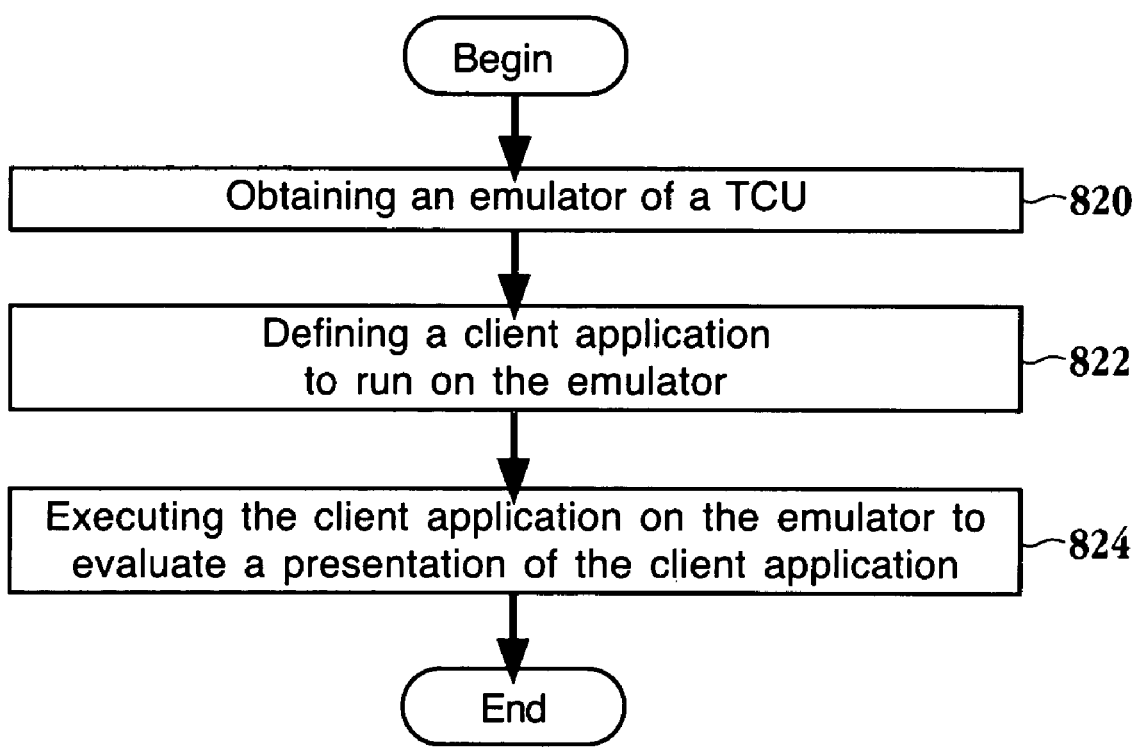
FIG. 9 is a flowchart diagram of the method operations for emulating a TCU user interface in accordance with one embodiment of the invention.

FIG. 9 is a flowchart diagram of the method operations for emulating a TCU user interface in accordance with one embodiment of the invention. The method initiates with the operation 820 to obtain an emulator of a TCU. For example, the emulator can be downloaded from a network or retrieved from a storage medium as discussed with reference to FIG. 6. The method advances to operation 822 where a client application configured to run on the emulator is defined. In one embodiment, the client application is a carlet. As mentioned above the carlet can be directed toward vehicle operation features, infotainment features, safety features, etc. The method then moves to operation 824 where the client application is executed by the emulator to evaluate the presentation on an emulated TCU user interface. Here, the TCU user interface is presented as discussed with reference to FIG. 7 in order to evaluate the look and feel of the presentation when it will eventually be deployed on a TCU. Thus, a developer is capable of emulating a TCU user interface on a personal computer having a commercially available operating system without the need for the physical presence of the TCU.

In summary, the emulator substitutes for the in-vehicle telematics unit and the devices that make it up, such as the screen display, knobs and levers. Thus, a useful framework is provided for creating software components described to the emulator through the use of XML based files. This framework is easily accessible to developers As an overview, the Java virtual machine (JM) is used as an interpreter to provide portability to Java applications. In general, developers design Java applications as hardware independent software modules, which are executed Java virtual machines. The Java virtual machine layer is developed to operate in conjunction with the native operating system of the particular hardware on which the communications framework 516c is to run. In this manner, Java applications (e.g., carlets) can be ported from one hardware device to another without requiring updating of the application code.

Unlike most programming languages, in which a program is compiled into machine-dependent, executable program code, Java classes are compiled into machine independent byte-code class files which are executed by a machine-dependent virtual machine. The virtual machine provides a level of abstraction between the machine independence of the byte-code classes and the machine-dependent instruction set of the underlying computer hardware. A class loader is responsible for loading the byte-code class files as needed, and an interpreter or just-in-time compiler provides for the transformation of byte-codes into machine code.

More specifically, Java is a programming language designed to generate applications that can run on all hardware platforms, small, medium and large, without modification. Developed by Sun, Java has been promoted and geared heavily for the Web, both for public Web sites and intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "bytecode". The bytecode is then converted (interpreted) into machine code at runtime. Upon finding a Java applet, the Web browser invokes a Java interpreter (Java Virtual Machine), which translates the bytecode into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

Although the present invention is described based on the Java programming language, other programming languages may be used to implement the embodiments of the present invention, such as other object oriented programming languages. Object-oriented programming is a method of creating computer programs by combining certain fundamental building blocks, and creating relationships among and between the building blocks. The building blocks in object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction to the object to execute a certain method. It consists of a method selection (name) and a plurality of arguments that are sent to an object. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. A class defines a type of object that typically includes both instance variables and methods for the class. An object class is used to create a particular instance of an object. An instance of an object class includes the variables and methods defined for the class. Multiple instances of the same class can be created from an object class. Each instance that is created from the object class is said to be of the same type or class.

A hierarchy of classes can be defined such that an object class definition has one or more subclasses. A subclass inherits its parent's (and grandparent's etc.) definition. Each subclass in the hierarchy may add to or modify the behavior specified by its parent class.

To illustrate, an employee object class can include "name" and "salary" instance variables and a "set_salary" method. Instances of the employee object class can be created, or instantiated for each employee in an organization. Each object instance is said to be of type "employee." Each employee object instance includes the "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

An object is a generic term that is used in the object-oriented programming environment to refer to a module that contains related code and variables. A software application can be written using an object-oriented programming language whereby the program's functionality is implemented using objects. Examples of object-oriented programming languages include C++ as well as Java.

Furthermore the invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the TCU discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A system for emulating a telematics client, comprising:
   a workstation in communication with a display screen;
   a software stack configured to be executed by the workstation to implement functionality for a telematics client, the software stack imitating a configuration of an in-vehicle telematics stack of a telematics control unit (TCU), the software stack further including:
      a service gateway for loading an emulator;
      a user interface (UD manager configured to communicate with the loaded emulator, wherein the UI manager enables a presentation of a TCU user interface without accessing the TCU.

2. The system of claim 1, wherein the software stack includes a user interface manager, the user interface manager including all functionality of an imitated user interface manager and additional functionality enabling a display screen associated with the imitated user interface manager to be displayed on the display screen.

3. The system of claim 1, further comprising:
   a communication framework enabling communication between layers of the software stack.

4. The system of claim 1, wherein, the functionality for the telematics client is provided by client applications.

5. The system of claim 4 wherein the client application is a carlet and the client application is executed on the TCU of a vehicle, the carlet configured to render control and interfacing with a component of the vehicle.

6. The system of claim 1, wherein the emulator is provided by one of downloading from a network and retrieving from a storage medium.

7. The system of claim 1, further including:
   a Java provisioning server in communication with the telematics client.

8. The system of claim 1, wherein the presentation of the TCU user interface includes a carlet browser, the carlet browser providing a list of carlets.

9. The system of claim 8, wherein control buttons are provided for navigating the carlet browser.

10. A method for emulating a telematics control unit (TCU) user interface, comprising:
    obtaining an emulator of a TCU;
    defining a client application configured to run on the emulator;
    executing the client application on the emulator to evaluate a presentation of the client application; and
    providing a workstation configured to output an emulation of a TCU user interface.

11. The method of claim 10, further including:
    deploying the client application in a TCU installed in a vehicle such that the presentation of the deployed client application is the same as the presentation on the emulator.

12. The method of claim 10, wherein a software stack of the TCU is emulated on a personal computer running a target platform and the client application is a carlet.

13. The method of claim 12, wherein the target platform is one of Windows™ and Solaris™ operating systems.

14. A method for loading an emulator on a workstation configured to provide an emulation of a telematics control unit (TCU) user interface, comprising:
launching a service gateway;
specifying an archive file defining an emulator for an in-vehicle telematics system;
executing the archive file to enable a display of a TCU user interface; and
reading a vehicle description file to define features of the TCU user interface.

15. The method of claim 14, wherein the vehicle description file is an extensible markup language (XML) file.

16. The method of claim 14, wherein each of the features is defined in a Java class file which is enclosed in a Java Archive file.

17. The method of claim 14, wherein the archive file is a Java Archive file defining an emulator.

18. The method of claim 14, wherein the method operation of executing the archive file to enable a display of a TCU user interface further includes:
enabling an emulator configured to provide a carlet browser defining a list of carlets, the carlets being Java applications having access.

19. The method of claim 18, further including:
navigating through the list of carlets and invoking a sub-carlet.

* * * * *